(12) United States Patent
Akahane et al.

(10) Patent No.: US 6,556,769 B1
(45) Date of Patent: Apr. 29, 2003

(54) CONTINUOUS RECORDING APPARATUS FOR SURVEILLANCE

(75) Inventors: Shigeru Akahane, Kanagawa (JP); Fumihiro Nagasawa, Kanagawa (JP); Takeo Nishijima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/089,202

(22) Filed: Jun. 2, 1998

(51) Int. Cl.$^7$ .......................... H04N 7/00; H04N 5/781
(52) U.S. Cl. ............................... 386/46; 386/124
(58) Field of Search ..................... 386/1, 45, 46, 386/117, 125, 126; 360/7; 348/231–233

(56) References Cited

U.S. PATENT DOCUMENTS

| | | | | |
|---|---|---|---|---|
| 5,257,142 A | * | 10/1993 | Hong | 386/46 |
| 5,345,430 A | * | 9/1994 | Moe | 369/7 |
| 5,371,551 A | * | 12/1994 | Logan et al. | 386/112 |
| 5,648,816 A | * | 7/1997 | Wakui | 348/233 |
| 5,703,994 A | * | 12/1997 | Lee et al. | 386/95 |
| 5,724,475 A | * | 3/1998 | Kirsten | 386/109 |
| 6,018,612 A | * | 1/2000 | Thomason et al. | 386/82 |
| 6,064,792 A | * | 5/2000 | Fox et al. | 386/46 |
| 6,137,943 A | * | 10/2000 | Kanda | 386/46 |
| 6,169,842 B1 | * | 1/2001 | Pijnenburg et al. | 386/46 |

FOREIGN PATENT DOCUMENTS

WO    WO-96/33579    * 10/1996    ......... H04N/9/804

* cited by examiner

*Primary Examiner*—Andrew Christensen
*Assistant Examiner*—Polin Chieu
(74) *Attorney, Agent, or Firm*—Frommer Lawrence & Haug LLP; William S. Frommer; Darren M. Simon

(57) ABSTRACT

Another operation such as searching for information recorded is achieved without interrupting recording of input information. A CPU controls a VCR block so that input information is recorded on a video tape when the video tape is ready for recording. When the video tape is not ready for recording, such as when searching for information recorded on the video tape is performed, the CPU controls a RAM block so that input information is temporarily recorded in RAM. When the video tape shifts from a state of not ready for recording to a state of ready for recording, the CPU controls the VCR block and the RAM block so that the information recorded in the RAM is transferred to the video tape for recording.

12 Claims, 7 Drawing Sheets

CONTINUOUS RECORDING APPARATUS FOR SURVEILLANCE

BACKGROUND OF THE INVENTION

1. Field of the Invention

The present invention relates to an apparatus and a method for recording input information such as video signals, applied to a video recording apparatus for surveillance and so on.

2. Description of the Related Art

A video recording apparatus for surveillance is used for ensuring security where an automatic teller machine (ATM), for example, is installed. Such a video recording apparatus may be called time lapse video cassette recorder (VCR). Usually, video signals outputted from a video surveillance camera are intermittently recorded on a video tape by means of a VCR.

Such a video recording apparatus for surveillance is usually used in a mode for recording video information for many hours such as a week or a month on a single video tape. Consequently, in order to search for any particular information on a video tape, it is required to stop recording while searching or to wait until recording finishes. In the former case, it is impossible to record information during searching. In the latter case, it is impossible to carry out searching as desired.

Some video recording apparatuses for surveillance have a repeat function for automatically rewinding a video tape to the start thereof when information is recorded as far as the end of the tape and restarting recording. With such a recording apparatus, however, recording is suspended while a video tape is being rewound.

Another problem is that when a video recording apparatus is used for recording information consecutively on a plurality of video tapes, recording is suspended while a tape is changed with another.

Furthermore, in a video recording apparatus of related art, a VCR section is not ready for recording for ten-odd seconds immediately after power-on. It is therefore impossible to start recording immediately after power-on.

SUMMARY OF THE INVENTION

It is an object of the invention to provide input information recording apparatus and method for allowing another operation such as searching for information recorded without interrupting recording of input information.

An input information recording apparatus of the invention comprises: a first recording means for recording input information on a first recording medium; a second recording means for temporarily recording input information on a second recording medium; and a control means for controlling the first recording means so that input information is recorded on the first recording medium when the first recording medium is ready for recording, controlling the second recording means so that input information is temporarily recorded on the second recording medium when the first recording medium is not ready for recording, and controlling the first and second recording means so that information recorded on the second recording medium is transferred to the first recording medium to be recorded thereon when the first recording medium shifts from a state of not ready for recording to a state of ready for recording.

Another input information recording apparatus of the invention comprises: a first recording means for recording input information on a first recording medium; a second recording means for temporarily recording input information on a second recording medium; a third recording means for temporarily recording input information on a third recording medium; and a control means for controlling the first recording means so that input information is recorded on the first recording medium when the first recording medium is ready for recording, controlling the second recording means so that input information is temporarily recorded on the second recording medium when the first recording medium is not ready for recording, controlling the first and second recording means so that information recorded on the second recording medium is transferred to the first recording medium to be recorded thereon and controlling the third recording means so that input information is temporarily recorded on the third recording medium during the transfer and recording of the information on the second recording medium when the first recording medium shifts from a state of not ready for recording to a state of ready for recording, and controlling the first and third recording means so that information recorded on the third recording medium is transferred to the first recording medium to be recorded thereon when recording of the information recorded on the second recording medium onto the first recording medium is completed.

A method for recording input information of the invention comprises the steps of: recording input information on the first recording medium when the first recording medium is ready for recording; recording input information temporarily on the second recording medium when the first recording medium is not ready for recording; and transferring information recorded on the second recording medium to the first recording medium to be recorded thereon when the first recording medium shifts from a state of not ready for recording to a state of ready for recording.

Another method for recording input information of the invention comprises the steps of: recording input information on the first recording medium when the first recording medium is ready for recording, recording input information temporarily on the second recording medium when the first recording medium is not ready for recording; and transferring information recorded on the second recording medium to the first recording medium to be recorded thereon while recording input information temporarily on the third recording medium when the first recording medium shifts from a state of not ready for recording to a state of ready for recording; and transferring information recorded on the third recording medium to the first recording medium to be recorded thereon when recording of the information recorded on the second recording medium onto the first recording medium is completed.

In the input information recording apparatus or method of the invention, input information is recorded on the first recording medium when the first recording medium is ready for recording. Input information is temporarily recorded on the second recording medium when the first recording medium is not ready for recording. Information recorded on the second recording medium is transferred to the first recording medium to be recorded thereon when the first recording medium shifts from a state of not ready for recording to a state of ready for recording.

In the other input information recording apparatus or method of the invention, input information is recorded on the first recording medium when the first recording medium is ready for recording. Input information is temporarily recorded on the second recording medium when the first recording medium is not ready for recording. Information recorded on the second recording medium is transferred to the first recording medium to be recorded thereon while input information is temporarily recorded on the third recording medium when the first recording medium shifts from a state of not ready for recording to a state of ready for recording. Information recorded on the third recording medium is transferred to the first recording medium to be recorded thereon when recording of the information recorded on the second recording medium onto the first recording medium is completed.

Other and further objects, features and advantages of the invention will appear more fully from the following description.

DETAILED DESCRIPTION OF THE PREFERRED EMBODIMENTS

Figure 1:
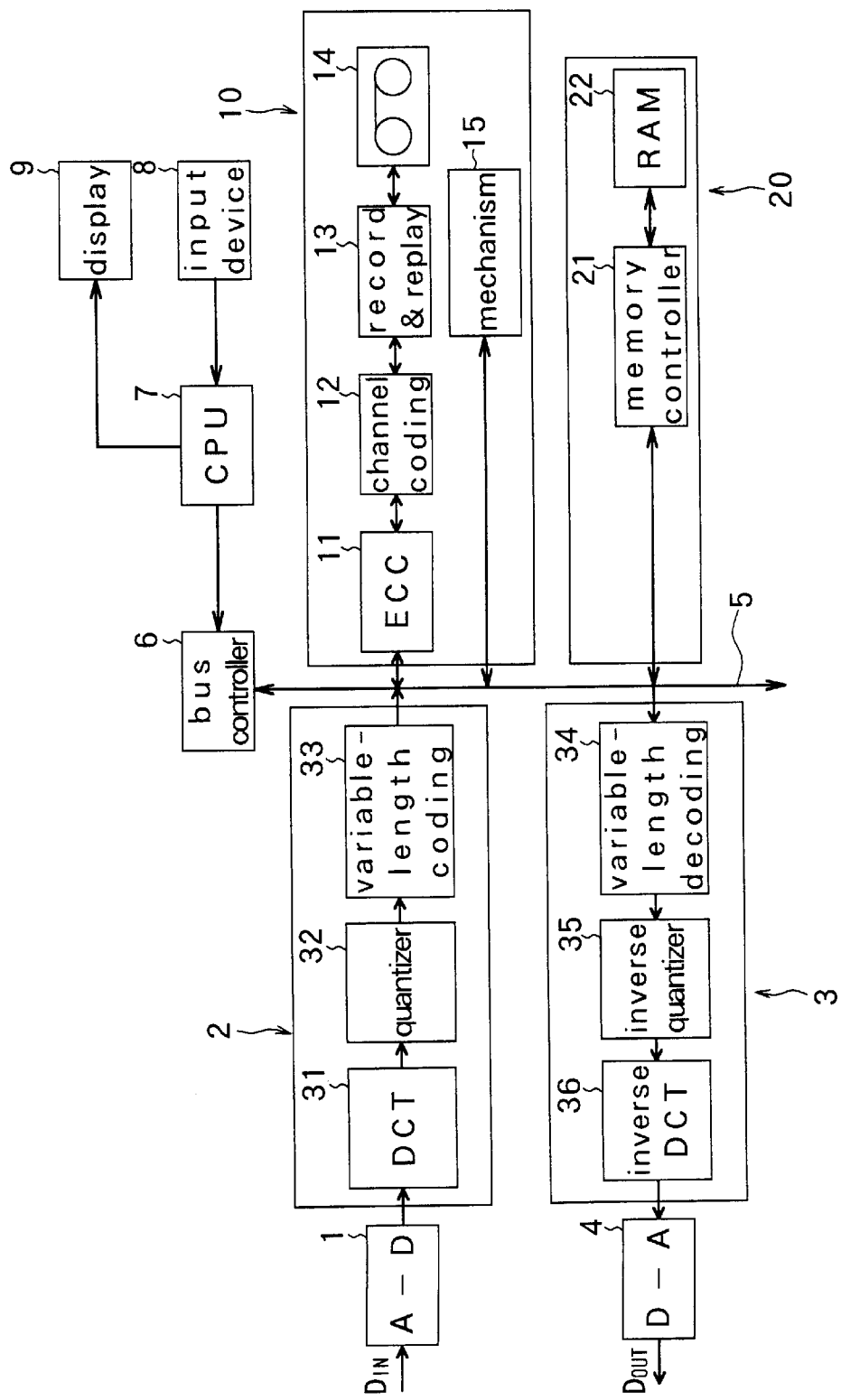
FIG. 1 is a block diagram of an input information recording apparatus of a first embodiment of the invention.

Preferred embodiments of the invention will now be described in detail with reference to the accompanying drawings. FIG. 1 is a block diagram of an input information recording apparatus of a first embodiment of the invention. The input information recording apparatus of the embodiment is used for a video recording apparatus for surveillance, for example. Input information includes at least video data from a video surveillance camera and so on. In some cases input information may further include audio data and any other additional data such as transaction numbers, card numbers, time and date in an ATM. In the following description, however, video data will be only described as input information for simplicity.

The input information recording apparatus of the embodiment comprises: an analog-digital (A-D) converter 1 for A-D conversion of analog input video data $D_{IN}$ from a video camera and so on; a compressor 2 for compressing data outputted from the A-D converter 1; a VCR block 10 as a first recording means for recording video data compressed at the compressor 2; a random access memory (RAM) block 20 as a second recording means for temporarily recording video data compressed at the compressor 2; an expander 3 for expanding video data recorded at the VCR block 10; and a digital-analog (D-A) converter 4 for D-A conversion of video data expanded at the expander 3 to be outputted as output video data $D_{OUT}$. The input information recording apparatus further comprises an internal bus 5 including a data bus and a control bus for connecting the compressor 2, the VCR block 10, the RAM block 20 and the expander 3 to one another and a bus controller 6 for controlling the internal bus 6.

The input information recording apparatus further comprises a CPU 7 connected to the bus controller 6 and functioning as a means for controlling the apparatus as a whole; an input device 8, such as a keyboard, connected to the CPU 7; and a display 9, such as a cathode ray tube (CRT), connected to the CPU 7.

The compressor 2 includes: a discrete cosine transformation (DCT) circuit 31 for performing DCT on data outputted from the A-D converter 1; a quantizer circuit 32 for quantizing data outputted from the DCT circuit 31; and a variable-length coding circuit 33 for performing variable-length coding on data outputted from the quantizer circuit 32 and outputting the data to the internal bus 5.

The expander 3 includes: a variable-length decoding circuit 34 for performing variable-length decoding on data from the internal bus 5; an inverse quantizer circuit 35 for performing inverse quantization on data outputted from the variable-length decoding circuit 34; and an inverse DCT circuit 36 for performing inverse DCT on data outputted from the inverse quantizer circuit 35 and outputting the data to the D-A converter 4.

The VCR block 10 is a section for recording data on a video tape 14 as a first recording medium and for replaying data on the video tape 14. The VCR block 10 includes: an error correcting code (ECC) section 11 connected to the internal bus 5; a channel coding section 12 connected to the ECC section 11; a record and replay section 13 connected to the channel coding section 12; and a mechanism section 15 including a transport mechanism for the video tape 14 and a drive section of rotating drum and so on. The record and replay section 13 includes a recording head, a replaying head and an erasing head.

In the VCR block 10, an ECC is added to data from the internal bus 5 at the ECC section 11 when recording is carried out. Channel coding is performed on the data at the channel coding section 12 for transforming the data to a form suitable for recording. The data is then recorded on the video tape 14 by means of the recording head of the record and replay section 13. Input video data $D_{IN}$ and corresponding data in various forms before recording will be collectively called input information in the following description.

For replaying, data on the video tape 14 is replayed by means of the replaying head of the record and replay section 13 in the VCR block 10. Channel decoding is performed on the data at the channel coding section 12. Error detection and correction are performed on the data at the ECC section 11. The data is then outputted to the internal bus 5.

The RAM block 20 includes a RAM 22 as a second recording medium and a memory controller 21 connected to the RAM 22 and the internal bus 5. The memory controller 21 controls writing of data from the internal bus 5 into the RAM 22 and reading of data recorded in the RAM 22 to be outputted to the internal bus 5.

The CPU 7 controls the VCR block 10 so that input information is recorded on the video tape 14 when the video tape 14 is ready for recording. When the video tape 14 is not ready for recording, the CPU 7 controls the RAM block 20 so that input information is temporarily recorded in the RAM 22. When the video tape 14 shifts from a state of not ready for recording to a state of ready for recording, the CPU 7 controls the VCR block 10 and the RAM block 20 so that information recorded in the RAM 22 is transferred to the video tape 14 for recording.

A state of not ready for recording of the video tape 14 applies to: when data searching described later is carried out; when the video tape 14 is rewound; when the video tape 14 is being replaced with another; ten-odd seconds immediately after power-on of the input information recording apparatus until the video tape 14 becomes ready for recording in the VCR block 10 and so on.

The CPU 7 has a function of searching for information recorded on the video tape 14. While searching is carried out, the CPU 7 allows input information to be temporarily recorded in the RAM 22. An instruction for searching is given to the CPU 7 from the input device 8. Information retrieved from the video tape 14 is outputted to the internal bus 5 from the VCR block 10. The information is then outputted as output video data $D_{OUT}$ through the expander 3 and the D-A converter 4.

The VCR block 10 has a function of automatically rewinding the video tape 14 to the start thereof if information is recorded as far as the end of the video tape 14 and restarting recording (a repeat function). The CPU 7 allows input information to be temporarily recorded in the RAM 22 while the video tape 14 is being rewound. The CPU 7 recognizes a status of the VCR block 10 from status information and so on from the VCR block 10.

When the video tape 14 is not placed in the VCR block 10 for replacing, the CPU 7 allows input information to be temporarily recorded in the RAM 22.

In the RAM block 20 (the memory controller 21) input information is recorded in the RAM 22 in the order of input of the information. The information recorded in the RAM 22 is read in the temporal order of input of the information and the information is transferred to the VCR block 10.

Operations of the input information recording apparatus of the embodiment will now be described. The following description is applicable to a method of recording input information of the embodiment as well. Reference is now made to a flowchart in FIG. 2 for describing main operations of the apparatus. The CPU 7 first determines whether key entry is made or not from the input device 8 and the content thereof (step S101). If no entry is made, the step is repeated. If key entry is made for instructing a normal start of recording, the CPU 7 controls the VCR block 10 so that recording of input information from a source outside the apparatus in the VCR block 10 (on the video tape 14) is started (step S110). The CPU 7 then returns to step S101. In the recording operation in the VCR block 10, A-D conversion is performed on input video data $D_{IN}$ at the A-D converter 1. The data is then compressed at the compressor 2 and sent to the VCR block 10 through the internal bus 5 to be recorded on the video tape 14 in the VCR block 10.

In step S101, if key entry is made for instructing a search during recording, the CPU 7 controls the RAM block 20 so that recording of input information from a source outside the apparatus in the RAM block 20 (in the RAM 22) is started (step S102). The CPU 7 then controls the VCR block 10 so that recording in the VCR block 10 is suspended (step S103). In the recording operation in the RAM block 20, A-D conversion is performed on input video data $D_{IN}$ at the A-D converter 1. The data is then compressed at the compressor 2 and sent to the RAM block 20 through the internal bus 5 to be recorded on the RAM 22 in the RAM block 20. Next, the CPU 7 controls the VCR block 10 so that a search is made for information on the video tape 14 (step S104). The CPU 7 then determines whether the search has completed or not (step S105). If the search has not completed (N), the search (step S104) is continued.

If the search has completed (Y in step S105), the CPU 7 controls the RAM block 20 and the VCR block 10 so that a replay of information recorded in the RAM block 20 is started without interrupting recording in the RAM block 20 (step S106). Recording of information from the RAM block 20 is started in the VCR block 10 (step S107). The information from the RAM block 20 is sent to the VCR block 10 through the internal bus. If the input information recording apparatus is used as a video recording apparatus for surveillance, video signals (input information) outputted from a video surveillance camera are intermittently recorded. It is therefore possible to perform replay between intermittent recording operations in the RAM block 20. As a result replay of information recorded may be performed without interrupting recording as described above. Recording of input information in the RAM block 20 and recording of information from the RAM block 20 in the VCR block 10 are performed in a time-sharing mode using time slots, for example, so that the recordings will not compete with each other in using the internal bus 5.

Next, the CPU 7 determines whether the replay of all the information recorded in the RAM block 20 has completed or not (step S108). If the replay has not completed yet (N), the step is repeated. If the replay has completed, (Y in step S108), the CPU 7 controls the RAM block 20 so that the replay in the RAM block 20 is stopped (step S109). The CPU 7 controls the VCR block 10 so that recording of input information from a source outside the apparatus in the VCR block 10 (on the video tape 14) is started (step S110). The CPU 7 then returns to step S101.

Figure 2:
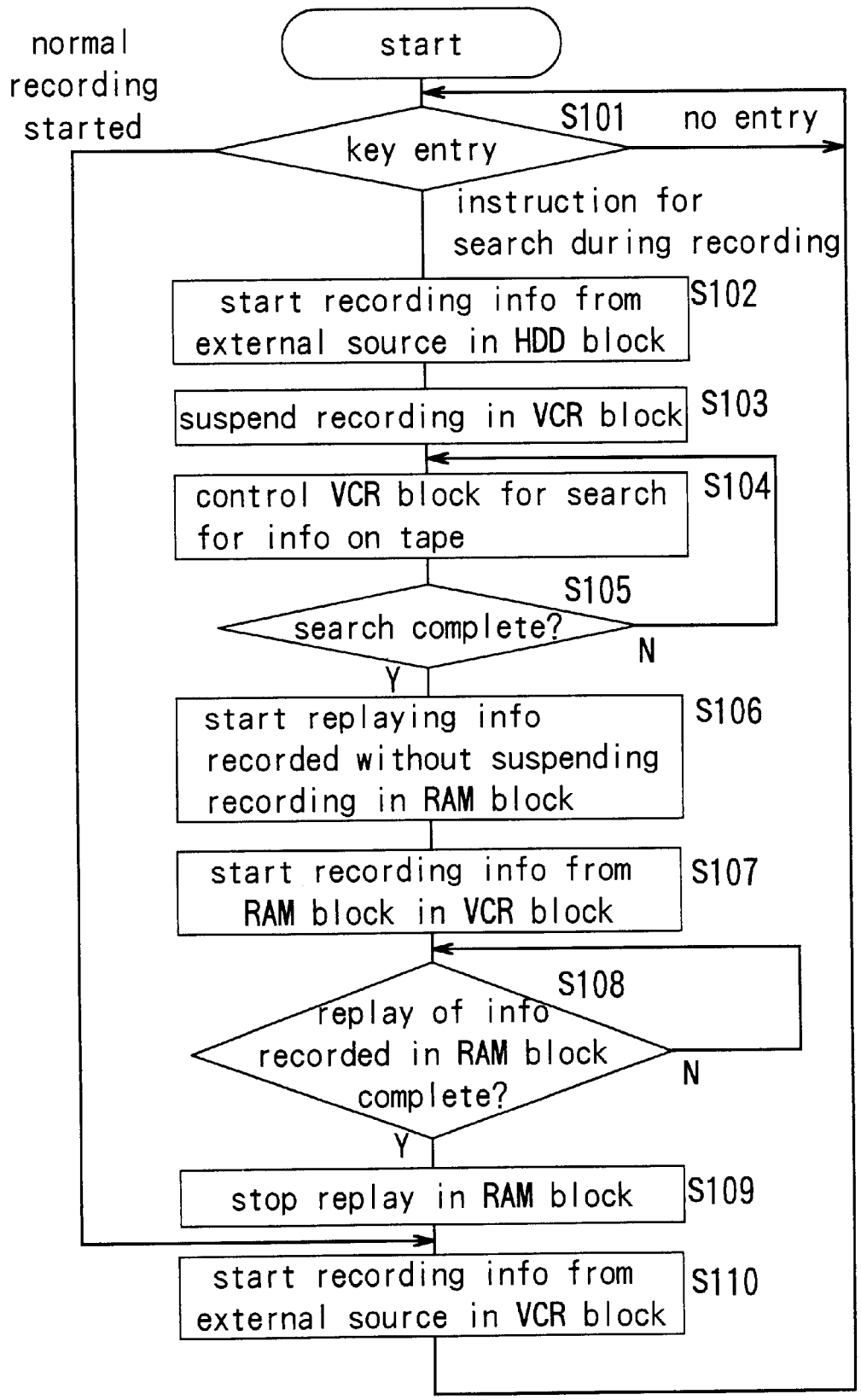
FIG. 2 is a flowchart showing main operations of the input information recording apparatus of the first embodiment of the invention.
Figure 3:
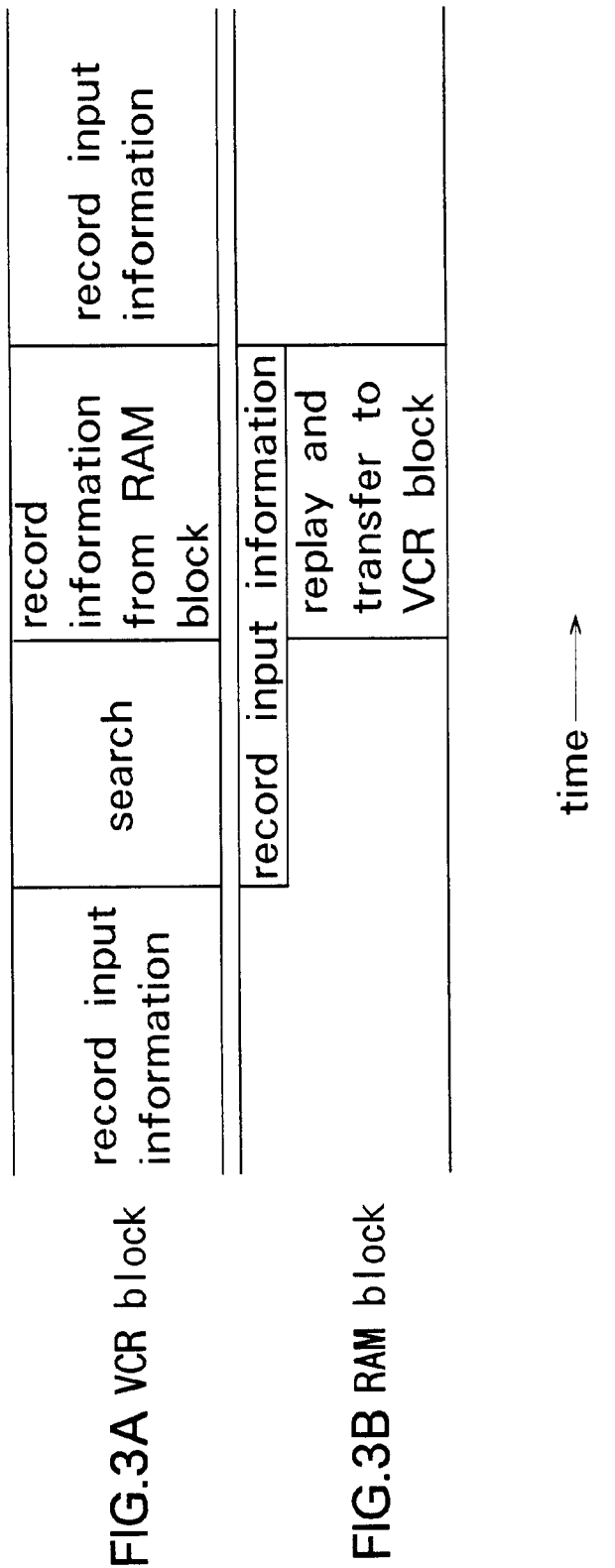
FIG. 3A and FIG. 3B illustrate timing of operations of the input information recording apparatus of the first embodiment of the invention.

FIG. 3A and FIG. 3B show timing of the operations of the VCR block 10 and the RAM block 20 when the operations including searching are performed following the steps shown in FIG. 2. In the VCR block 10, as shown in FIG. 3A, recording of input information is suspended and a search is carried out. If the search has completed, recording of information recorded in the RAM block 20 is performed. Recording of input information is then started again. In the RAM block 20, as shown in FIG. 3B, recording of input information is started at the same time as the search is started in the VCR block 10. If the search has completed in the VCR block 10, information recorded in the RAM block 20 is started to be replayed and transferred to the VCR block 10 without interrupting recording of input information. The operation is completed if all the information recorded is replayed.

In addition to the main operations described so far, the input information recording apparatus performs operations as follows. The CPU 7 allows input information to be temporarily recorded in the RAM 22 while the video tape 14 is rewound in the VCR block 10 by means of the repeat function. When the video tape 14 shifts from the state of not ready for recording to the state of ready for recording, the CPU 7 controls the VCR block 10 and the RAM block 20 so that the information recorded in the RAM 22 is transferred to the video tape 14 for recording.

While input information is continuously recorded on the video tape 14, the CPU 7 allows input information to be temporarily recorded in the RAM 22 when the video tape 14 is not placed in the VCR block 10 to be replaced with another. When the video tape 14 is placed in the VCR block 10 and shifts from the state of not ready for recording to the state of ready for recording, the CPU 7 controls the VCR block 10 and the RAM block 20 so that the information recorded in the RAM 22 is transferred to the video tape 14 for recording.

Immediately after power-on of the input information recording apparatus until the video tape 14 in the VCR block 10 becomes ready for recording, the CPU 7 allows input information to be temporarily recorded in the RAM 22. When the video tape 14 shifts from the state of not ready for recording to the state of ready for recording, the CPU 7 controls the VCR block 10 and the RAM block 20 so that the information recorded in the RAM 22 is transferred to the video tape 14 for recording.

In the apparatus and method for recording input information of the embodiment as described so far, input information is recorded on the video tape 14 when the video tape 14 is ready for recording in the VCR block 10. When the video tape 14 is not ready for recording, input information is temporarily recorded in the RAM 22 in the RAM block 20. When the video tape 14 shifts from a state of not ready for recording to a state of ready for recording, the information recorded in the RAM 22 is transferred to the video tape 14 for recording. As a result, another operation such as searching for information recorded on the video tape 14 may be performed without interrupting recording of input information.

The embodiment of the invention therefore allows a search for information recorded on the video tape 14 currently used without interrupting recording. The embodiment further allows a search for information on a video tape placed in the VCR block 10 on which information has been previously recorded without interrupting recording of input information.

The embodiment allows rewinding of the video tape 14 by means of the repeat function without interrupting recording. Seamless recording is thus achieved.

The embodiment allows video tape replacement without interrupting recording for continuously recording input information on a plurality of video tapes in one input information recording apparatus. Continuous recording is thus achieved without a plurality of recording apparatuses.

Furthermore, recording of input information may be started immediately after power-on in the embodiment.

In the embodiment input information is recorded in the RAM 22 in the RAM block 20 in the temporal order of input of the information. The information recorded in the RAM 22 is read in the temporal order of input of the information and the information is transferred to the VCR block 10. The information temporarily recorded in the RAM 22 is thus recorded on the video tape 14 in the temporal order of input of the information. Search is therefore easy for information recorded on the video tape 14.

Figure 4:
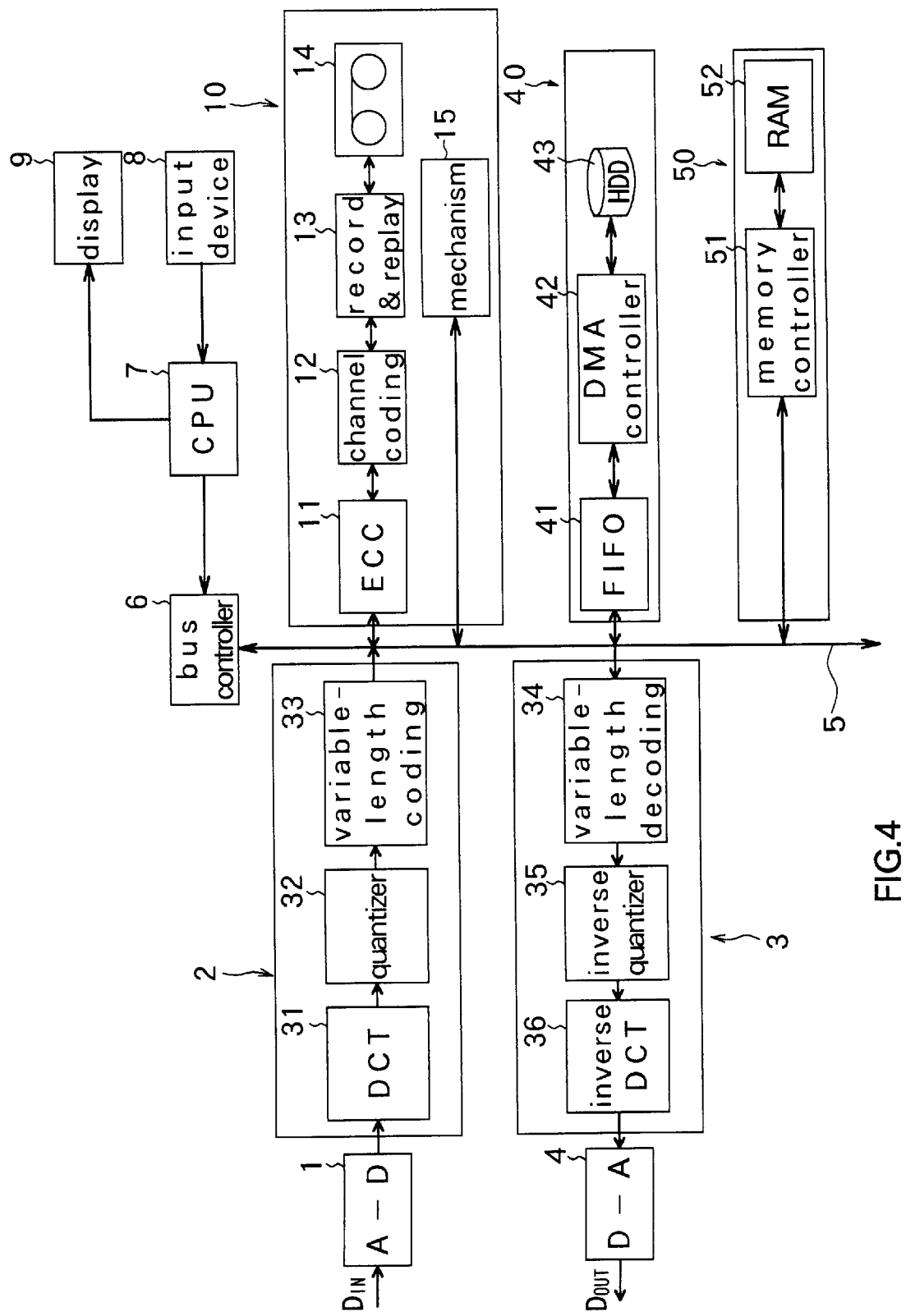
FIG. 4 is a block diagram of an input information recording apparatus of a second embodiment of the invention.

Reference is now made to FIG. 4 showing a block diagram of an input information recording apparatus of a second embodiment of the invention. Instead of the RAM block 20 as the second recording means in the apparatus shown in FIG. 1, the apparatus of the second embodiment comprises a hard disk drive (HDD) block 40 functioning as the second recording means for temporarily recording video data compressed at the compressor 2. The apparatus further comprises a RAM block 50 functioning as a third recording means for temporarily recording input information.

The HDD block 40 includes: a HDD 43 including hard disks (disk platters) as a second recording medium; a direct memory access (DMA) controller 42 coupled to the HDD 43 for performing control on recording of information in the HDD 43 and replaying of information recorded in the HDD 43; and a first-in first-out (FIFO) memory 41 coupled to the DMA controller 42 and the internal bus 5.

The RAM block 50 includes RAM 52 as the third recording medium and a memory controller 51 connected to the RAM 52 and the internal bus 5. The memory controller 51 performs control on writing of data from the internal bus 5 into the RAM 52 and reading of data recorded in the RAM 52 to be outputted to the internal bus 5.

In the embodiment the CPU 7 controls the VCR block 10 so that input information is recorded on the video tape 14 when the video tape 14 is ready for recording. When the video tape 14 is not ready for recording, the CPU 7 controls the HDD block 40 so that input information is temporarily recorded on the hard disk in the HDD 43. When the video tape 14 shifts from a state of not ready for recording to a state of ready for recording, the CPU 7 controls the VCR block 10 and the HDD block 40 so that information recorded on the hard disk is transferred to the video tape 14 for recording. While information recorded on the hard disk is recorded on the video tape 14, the CPU 7 controls the RAM block 50 so that input information is temporarily recorded in the RAM 52. If recording of the information on the hard disk onto the video rape 14 has completed, the CPU 7 controls the VCR block 10 and the RAM block 50 so that information recorded in the RAM 52 is transferred to the video tape 14 for recording without interrupting recording of input information in the RAM 52.

As in the first embodiment the CPU 7 has a function of searching for information recorded on the video tape 14. While searching is carried out, input information is temporarily recorded on the hard disk. Information retrieved from the video tape 14 is outputted to the outside as output video data $D_{OUT}$ through the expander 3 and the D-A converter 4.

The CPU 7 allows input information to be temporarily recorded on the hard disk while the video tape 14 is being rewound in the VCR block 10 by means of the repeat function.

While input information is continuously recorded on the video tape 14, the CPU 7 allows input information to be temporarily recorded on the hard disk when the video tape 14 is not placed in the VCR block 10 for replacing.

In the HDD block 40 (the DMA controller 42) input information is recorded on the hard disk in the HDD 43 in the order of input of the information. The information recorded on the hard disk is read in the temporal order of input of the information and the information is transferred to the VCR block 10.

Operations of the input information recording apparatus of the embodiment will now be described. The following description is applicable to a method of recording input information of the embodiment as well. Reference is now made to a flowchart in FIG. 5 for describing main operations of the apparatus. The CPU 7 first determines whether key entry is made or not from the input device 8 and the content thereof (step S201). If no entry is made, the step is repeated. If key entry is made for instructing a normal start of recording, the CPU 7 controls the VCR block 10 so that recording of input information from a source outside the apparatus in the VCR block 10 (on the video tape 14) is started (step S214). The CPU 7 then returns to step S201. In the recording operation in the VCR block 10, A-D conversion is performed on input video data $D_{IN}$ at the A-D converter 1. The data is then compressed at the compressor 2 and sent to the VCR block 10 through the internal bus 5 to be recorded on the video tape 14 in the VCR block 10.

In step S201, if key entry is made for instructing a search during recording, the CPU 7 controls the HDD block 40 so that recording of input information from a source outside the apparatus in the HDD block 40 (on the hard disk) is started (step S202). The CPU 7 then controls the VCR block 10 so that recording in the VCR block 10 is suspended (step S203).

In the recording operation in the HDD block 40, A-D conversion is performed on input video data $D_{IN}$ at the A-D converter 1. The data is then compressed at the compressor 2 and sent to the HDD block 40 through the internal bus 5. The data is then given to the DMA controller 42 through the FIFO memory 41 to be recorded on the hard disk in the HDD 43 with the aid of the DMA controller 42.

Next, the CPU 7 controls the VCR block 10 so that a search is made for information on the video tape 14 (step S204). The CPU 7 then determines whether the search has completed or not (step S205). If the search has not completed (N), the search (step S204) is continued.

If the search has completed (Y in step S205), the CPU 7 controls the RAM block 50 so that input information from a source outside the apparatus in the RAM block 50 (in the RAM 52) is started (step S206). The CPU 7 controls the HDD block 40 and the VCR block 10 so that recording in the HDD block 40 is suspended and a replay of information recorded in the HDD block 40 is started (step S207). Recording of information from the HDD block 40 is started in the VCR block 10 (step S208). The information from the HDD block 40 is sent to the VCR block 10 through the internal bus 5. Recording of input information in the RAM block 50 and recording of information from the HDD block 40 in the VCR block 10 are performed in a time-sharing mode using a time slot, for example, so that the recordings will not compete with each other in using the internal bus 5.

Next, the CPU 7 determines whether the replay of all the information recorded in the HDD block 40 has completed or not (step S209). If the replay has not completed yet (N), the step is repeated. If the replay has completed, (Y in step S209), the CPU 7 controls the RAM block 50 and the VCR block 10 so that a replay of information recorded in the RAM block 50 is started without interrupting recording in the RAM block 50 (step S210). Recording of information from the RAM block 50 is started in the VCR block 10 (step S211). The information from the RAM block 50 is sent to the VCR block 10 through the internal bus 5.

Next, the CPU 7 determines whether the replay of all the information recorded in the RAM block 50 has completed or not (step S212). If the replay has not completed yet (N), the step is repeated. If the replay has completed, (Y in step S212), the CPU 7 controls the RAM block 50 so that the replay in the RAM block 50 is stopped (step S213). The CPU 7 controls the VCR block 10 so that recording of input information from a source outside the apparatus in the VCR block 10 (on the video tape 14) is started (step S214). The CPU 7 then returns to step S201.

Figure 5:
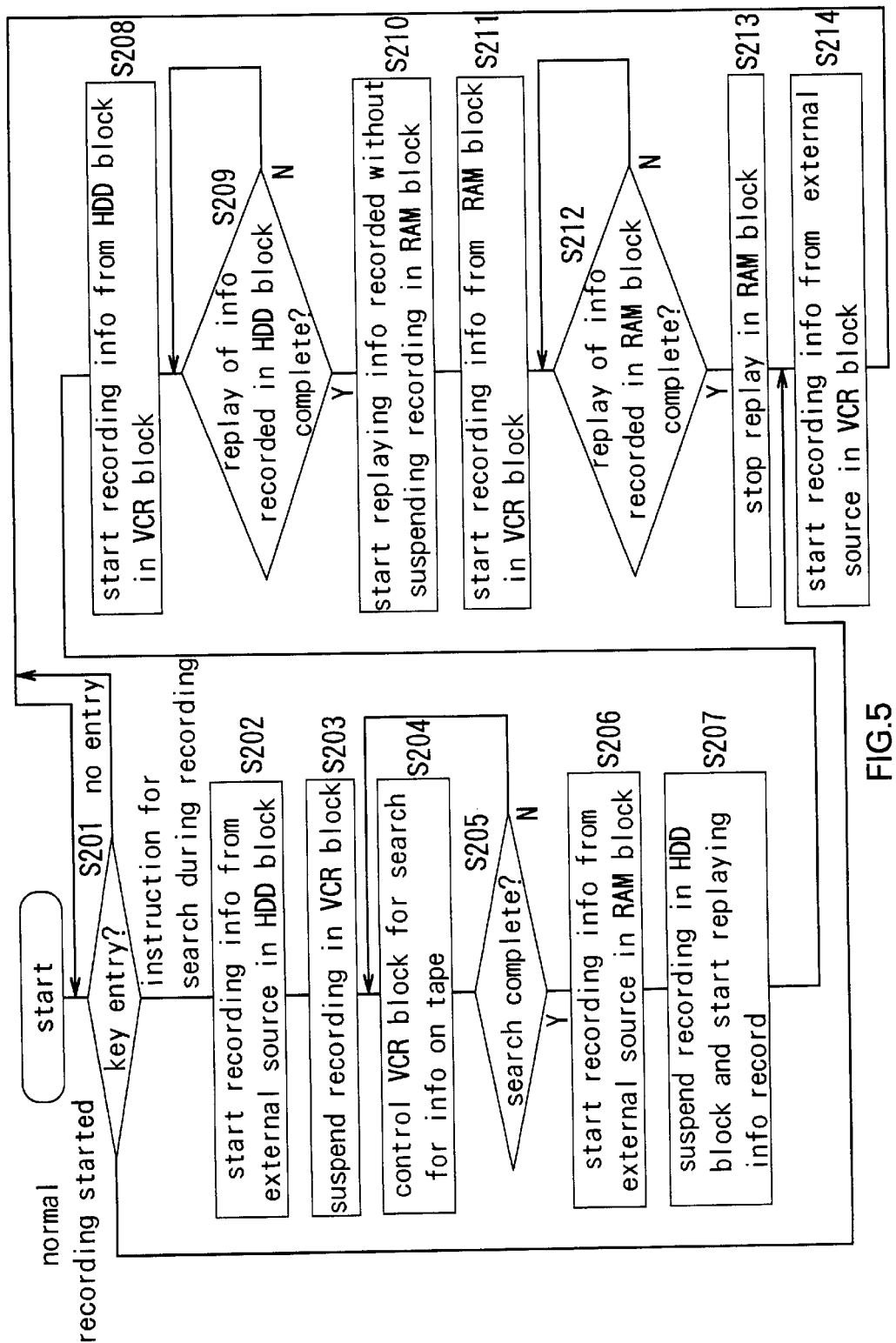
FIG. 5 is a flowchart showing main operations of the input information recording apparatus of the second embodiment of the invention.
Figure 6:
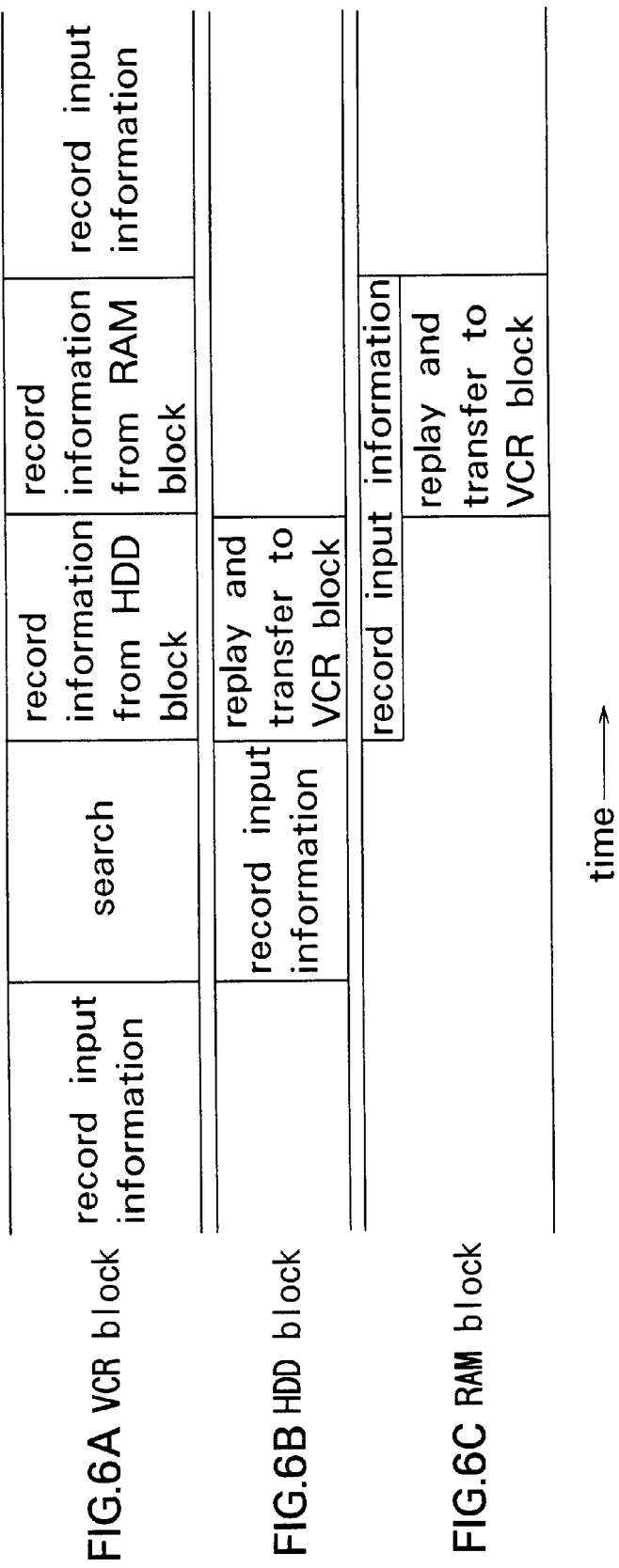
FIG. 6A, FIG. 6B and FIG. 6C illustrate timing of operations of the input information recording apparatus of the second embodiment of the invention.

FIG. 6A, FIG. 6B and FIG. 6C show timing of the operations of the VCR block 10, the HDD block 40 and the RAM block 50 when the operations including searching are performed following the steps shown in FIG. 5. In the VCR block 10, as shown in FIG. 6A, recording of input information is suspended and a search is carried out. If the search has completed, recording of information recorded in the HDD block 40 is performed. Recording of information recorded in the RAM block 50 is further performed. Recording of input information is then started again. In the HDD block 40, as shown in FIG. 6B, recording of input information is started at the same time as the search is started in the VCR block 10. If the search has completed in the VCR block 10, recording of input information is suspended and information recorded is started to be replayed and transferred to the VCR block 10. The operation is completed if all the information recorded is replayed. In the RAM block 50, as shown in FIG. 6C, recording of input information is started at the same time as information recorded in the HDD block 40 is started to be replayed and transferred to the VCR block 10. If replay and transfer of all the information recorded in the HDD block 40 to the VCR block 10 has completed, information recorded is started to be replayed and transferred to the VCR block 10 without interrupting recording of input information. The operation is completed if all the information recorded is replayed.

In addition to the main operations described so far, the input information recording apparatus performs operations as follows. The CPU 7 allows input information to be temporarily recorded on the hard disk while the video tape 14 is rewound in the VCR block 10 by means of the repeat function, while the video tape 14 is not placed in the VCR block 10 to be replaced with another, or immediately after power-on of the input information recording apparatus while the HDD 43 is on standby and ready for operation until the video tape 14 in the VCR block 10 becomes ready for recording. When the video tape 14 shifts from the state of not ready for recording to the state of ready for recording, the CPU 7 allows the information recorded on the hard disk to be transferred to the video tape 14 for recording. The CPU 7 allows input information to be temporarily recorded in the RAM 52 while information recorded on the hard disk is recorded on the video tape 14. If the recording of the information on the hard disk onto the video tape 14 has completed, the information recorded in the RAM 52 is transferred to the video tape 14 for recording.

After power-on of the input information recording apparatus while the apparatus is completely turned off until the video tape 14 in the VCR block 10 becomes ready for recording, the CPU 7 may allow input information to be temporarily recorded in the RAM 52. When the video tape 14 shifts from a state of not ready for recording to a state of ready for recording, the CPU 7 may allow the information recorded in the RAM 52 to be transferred to the video tape 14 for recording.

Since the hard disk is utilized as the second recording medium in the embodiment, a greater amount of information is capable of being temporarily recorded compared to the first embodiment. As a result, another operation such as searching may be performed for a longer time. However, it is difficult to replay information recorded on the hard disk without interrupting recording of information on the hard disk due to the limitation of information transfer capability of the HDD 43. Therefore the RAM 52 of semiconductor memory offering high access speed is provided in the embodiment as the third recording medium. While information on the hard disk is recorded onto the video tape 14, input information is temporarily recorded in the RAM 52. If the recording of the information onto the video tape 14 has completed, the information recorded in the RAM 52 is transferred to the video tape 14 for recording. As a result, the embodiment achieves temporary recording of a great amount of information while another operation such as searching for information recorded on the video tape 14 is performed without interrupting recording of input information.

The remainder of configuration, operations and effects of the embodiment are similar to those of the first embodiment.

Figure 7:
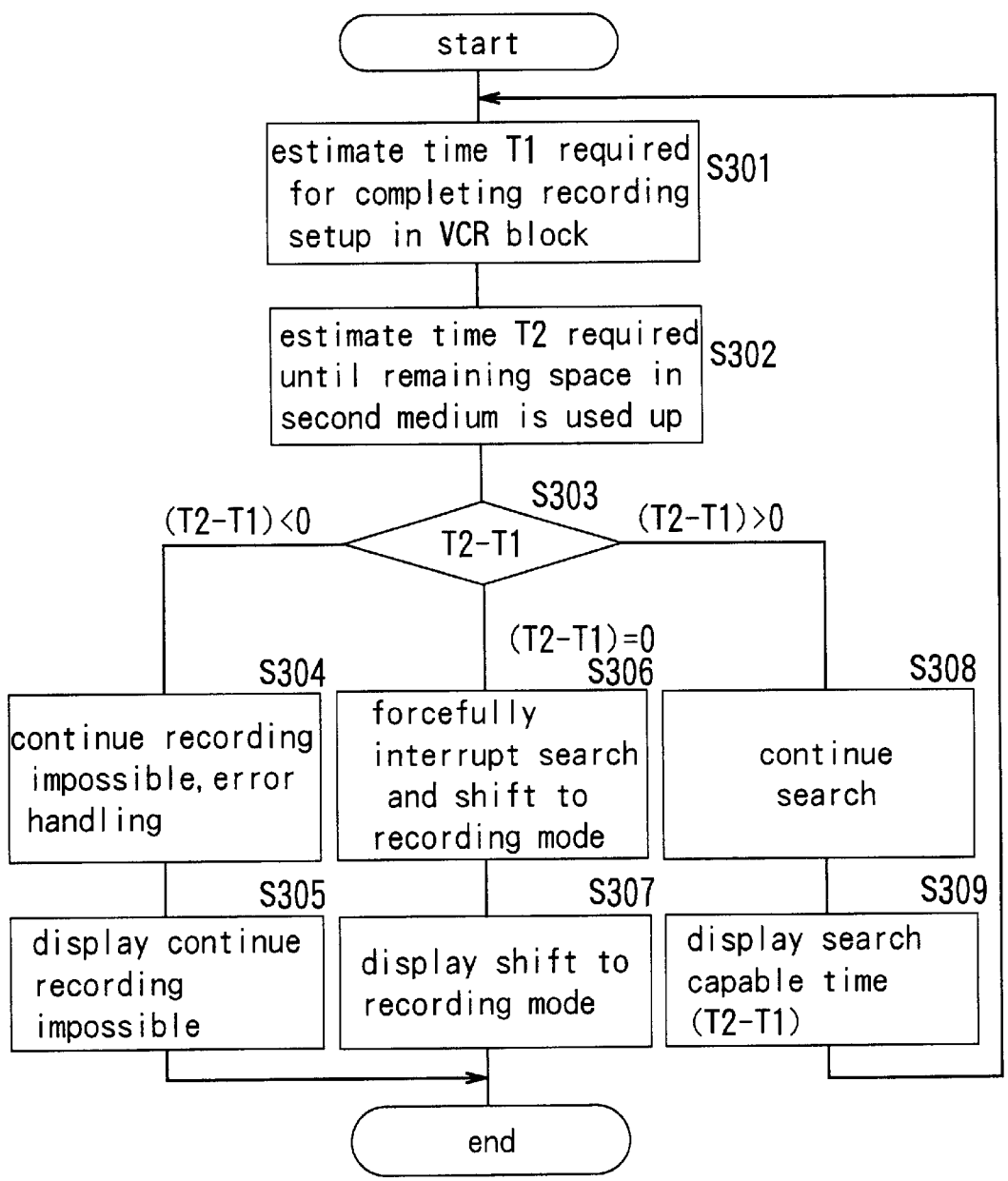
FIG. 7 is a flowchart showing control operations of a central processing unit (CPU) relating to limitation of searching in the input information recording apparatus of a third embodiment of the invention.

Reference is now made to FIG. 7 for describing a third embodiment of the invention. The third embodiment provides a time limit for another operation such as searching performed during recording in the first or second embodiment.

If another operation such as searching is performed without interrupting recording, the time spent for the operation is limited by the recording capacity of the second recording medium wherein input information is temporarily recorded. Therefore, in the embodiment, a time during which recording on the second recording medium is allowed, that is, time limit of another operation that can be performed during recording is calculated and displayed. Before the operation is performed beyond the time limit, the operation is automatically terminated and recording on the second recording medium is terminated as well. The mode is then shifted to the normal recording mode (recording in the VCR block 10).

FIG. 7 shows control operations of the CPU 7 on limitation of searching. The CPU 7 first estimates time T1 required until a setup for recording is completed in the VCR block 10 (step S301). In the VCR block 10, time is required for shifting a tape position from a current position to a position where recording is started. In addition, a setup time is required for recording continuously with a track pattern recorded on the tape. Time T1 is a combination of these times required.

Next, the CPU 7 estimates time T2 required until the remaining space of the second recording medium (the RAM 52 in the first embodiment or the hard disk in the HDD 43 in the second embodiment) is used up (step S302). Time T2 (second) is given by the equation below where $R_t$ (frame/second) is a recording cycle, Z (byte) is the remaining space in the second recording medium and X (byte/frame) is an amount of image information.

$$T2=(Z/X)/R_t$$

Next, the CPU 7 calculates T2−T1 for determining whether (T2−T1)<0, (T2−T1)=0 or (T2−T1)>0 (step S303). T2−T1 represents a time during which recording on the second recording medium is allowed, that is, time limit of another operation that can be performed during recording. If (T2−T1)<0, the CPU 7 determines that it is impossible to continue recording and performs error handling (step S304). The display 9 indicates that it is impossible to continue recording (step S305). The operation with regard to limitation of searching is thus completed.

In step S303, if (T2−T1)=0, the CPU 7 forcefully interrupts searching and shifts to the recording mode (step S306). The display 9 indicates that the mode is shifted to the recording mode (step S307). The operation with regard to limitation of searching is thus completed.

In step S303, if (T2−T1)>0, the CPU 7 continues searching (step S308). The display 9 indicates search capable time (T1−T2) (step S309). The CPU then returns to step S301.

Although FIG. 7 shows control operation of the CPU 7 on limitation of searching, control operation of the CPU 7 on limitation of replacing the video tape 14 and so on is similar to the one shown in FIG. 7.

In the embodiment, before the other operation is performed beyond the time limit during recording, the other operation is automatically terminated and recording on the second recording medium is terminated as well. The mode is then shifted to the normal recording mode. This prevents interruption of recording of input information when recording of input information on the second medium is impossible. The remainder of configuration, operations and effects of the embodiment are similar to those of the first or second embodiment.

The invention is not limited to the embodiments described so far but may be practiced in still other ways. For example, the second and third recording media may be both hard disks. Besides the video tape, the first recording medium may be any other removable recording medium such as a writable optical disk. Although video signals are compressed for recording in the foregoing embodiments, video signals may not be compressed for recording in the invention. The invention is not limited to the video recording apparatus for surveillance but may be applied to an apparatus for any other purpose.

In the input information recording apparatus or method of the invention described so far, input information is recorded on the first recording medium when the first recording medium is ready for recording. Input information is temporarily recorded on the second recording medium when the first recording medium is not ready for recording. Information recorded on the second recording medium is transferred to the first recording medium to be recorded thereon when the first recording medium shifts from a state of not ready for recording to a state of ready for recording. As a result, another operation such as searching for information recorded is achieved without interrupting recording of input information.

In the other input information recording apparatus or method of the invention, input information is recorded on the first recording medium when the first recording medium is ready for recording. Input information is temporarily recorded on the second recording medium when the first recording medium is not ready for recording. Information recorded on the second recording medium is transferred to the first recording medium to be recorded thereon and input information is temporarily recorded on the third recording medium during the transfer and recording of the information when the first recording medium shifts from a state of not ready for recording to a state of ready for recording. Information recorded on the third recording medium is transferred to the first recording medium to be recorded thereon when recording of the information recorded on the second recording medium onto the first recording medium is completed. As a result, another operation such as searching for information recorded is achieved without interrupting recording of input information. In addition, a greater amount of information may be temporarily recorded.

In still the other input information recording apparatus of the invention, a time during which recording on the second recording medium is allowed is calculated while input information is recorded on the second recording medium. Before recording on the second recording medium is performed beyond the time calculated, the recording on the second recording medium is terminated and the operation shifts to recording input information on the first recording medium. This prevents interruption of recording of input information when recording of input information on the second medium is impossible.

Obviously many modifications and variations of the present invention are possible in the light of the above teachings. It is therefore to be understood that within the scope of the appended claims the invention may be practiced otherwise than as specifically described.

What is claimed is:

1. A recording apparatus for continuous digital recording of input information, comprising:

a converter for converting and compressing an analog input signal into digital data;

a first recording means for recording digital data on a tape medium; said first recording means automatically rewinding the tape medium to a start thereof if digital data of a video program is recorded as far as an end of the tape medium and restarting recording of said video program;

a second recording means for temporarily recording digital data in a random access memory;

a control means for controlling the first recording means so that digital data is recorded directly from said converter onto the tape medium when the tape medium is ready for recording, controlling the second recording means so that digital data is temporarily recorded directly from said converter into the random access memory when the tape medium is not ready for recording, and controlling the first and second recording means so that information recorded in the random access memory is transferred to the tape medium to be recorded thereon when the tape medium shifts from a state of not ready for recording to a state of ready for recording; the control means directing the digital data of said video program to be temporarily recorded in the random access memory while the first recording means is automatically rewinding the tape medium; and a bus for transferring digital data between said converter, said first recording means, and said second recording means in response to commands from said control means.

2. A recording apparatus according to claim 1, wherein the controls means includes a function of searching for information recorded as digital data on the tape medium and directs digital data to be temporarily recorded in the random access memory while the searching is carried out.

3. A recording apparatus according to claim 1, wherein the second recording means transfers digital data recorded in the random access memory to the tape medium in the order in which the digital data was recorded.

4. A recording apparatus according to claim 1, wherein the control means calculates a maximum time for recording digital data in the random access memory and shifts recording from said second recording means to said first recording means before said maximum time is reached.

5. A recording apparatus according to claim 1, wherein the tape medium is a removable medium; and the control means directs digital data to be temporarily recorded in the random access memory while the tape medium is removed.

6. A recording apparatus for continuous digital recording of input information, comprising:

a converter for converting and compressing an analog input signal into digital data;

a first recording means for recording digital data on a tape medium; said first recording means automatically rewinding the tape medium to a start thereof if digital data of a video program is recorded as far as an end of the tape medium and restarting recording of said video program;

a second recording means for temporarily recording digital data on a disk medium;

a third recording means for temporarily recording digital data in a random access memory;

a control means for controlling the first recording means so that digital data is recorded directly from said converter onto the tape medium when the tape medium is ready for recording, controlling the second recording means so that digital data is temporarily recorded directly from said converter onto the disk medium when the tape medium is not ready for recording, controlling the first and second recording means so that digital data recorded on the disk medium is transferred to the tape medium to be recorded thereon and controlling the third recording means so that digital data is temporarily recorded directly from said converter into the random access memory during the transfer and recording of the digital data on the disk medium when the tape medium shifts from a state of not ready for recording to a state of ready for recording, and controlling the first and third recording means so that digital data recorded in the random access memory is transferred to the tape medium to be recorded thereon when recording of the digital data recorded on the disk medium onto the tape medium is completed; the control means directing the digital data of said video program to be temporarily recorded on the disk medium while the first recording means is automatically rewinding the tape medium; and a bus for transferring digital data between said converter, said first recording means, said second recording means, and said third recording means in response to commands from said control means.

7. A recording apparatus according to claim 6, wherein the controls means includes a function of searching for information recorded as digital data on the tape medium and directs digital data to be temporarily recorded on the disk medium while the searching is carried out.

8. A recording apparatus according to claim 6, wherein the second recording means transfers digital data recorded on the disk medium to the tape medium in the order in which the digital data was recorded.

9. A recording apparatus according to claim 6, wherein the control means calculates a maximum time for recording digital data on the disk medium and shifts recording from said second recording means to said first recording means before said maximum time is reached.

10. A recording apparatus according to claim 6, wherein the tape medium is a removable medium; and the control means directs digital data to be temporarily recorded on the disk medium while the tape medium is removed.

11. A method for continuous digital recording of input information using a tape medium for recording digital data and a random access memory for temporarily recording digital data, comprising the steps of:

converting and compressing an analog input signal into digital data;

recording digital data directly onto the tape medium when the tape medium is ready for recording;

automatically rewinding the tape medium to a start thereof if digital data of a video program is recorded as far as an end of the tape medium and restarting recording of said video program;

recording digital data temporarily directly onto the random access memory when the tape medium is automatically rewinding; and transferring digital data recorded on the random access memory to the tape medium to be recorded thereon when the tape medium shifts from automatically rewinding to a state of ready for recording.

12. A method for continuous digital recording of input information using a tape medium for recording digital data, a disk medium for temporarily recording digital data, and a random access memory for temporarily recording digital data, comprising the steps of:

converting and compressing an analog input signal into digital data;

recording digital data directly onto the tape medium when the tape medium is ready for recording;

automatically rewinding the tape medium to a start thereof if digital data of a video program is recorded as far as an end of the tape medium and restarting recording of said video program;

recording digital data temporarily directly onto the disk medium when the tape medium is automatically rewinding;

transferring digital data recorded on the disk medium to the tape medium to be recorded thereon while recording input information temporarily in the random access memory when the tape medium shifts from automatically rewinding to a state of ready for recording; and transferring digital data recorded on the random access memory to the tape medium to be recorded thereon when recording of the information recorded on the disk medium onto the tape medium is completed.

* * * * *